United States Patent [19]

Richards et al.

[11] Patent Number: 5,276,519
[45] Date of Patent: Jan. 4, 1994

[54] VIDEO IMAGE CAPTURE APPARATUS FOR DIGITALLY COMPENSATING IMPERFECTIONS INTRODUCED BY AN OPTICAL SYSTEM

[75] Inventors: John W. Richards, Stockbridge; Morgan W. A. David, Farnham, both of United Kingdom

[73] Assignee: Sony United Kingdom Limited, Staines, United Kingdom

[21] Appl. No.: 880,038

[22] Filed: May 8, 1992

[30] Foreign Application Priority Data

Jun. 21, 1991 [GB] United Kingdom ................ 9113440

[51] Int. Cl.⁵ .................. H04N 5/30; H04N 5/225; H04N 5/213; G06K 9/32
[52] U.S. Cl. .................................... 358/209; 358/225; 358/167; 358/44; 382/44
[58] Field of Search ............. 358/209, 213.11, 213.15, 358/225, 43, 44, 167; 382/44, 45, 50

[56] References Cited

U.S. PATENT DOCUMENTS

| | | | |
|---|---|---|---|
| 4,314,281 | 2/1982 | Wiggins et al. | 382/50 |
| 4,370,641 | 1/1983 | Kantor et al. | 358/209 |
| 4,549,208 | 10/1985 | Kamejima et al. | 358/108 |
| 4,683,493 | 7/1987 | Taft et al. | 358/213.15 |
| 4,751,660 | 6/1988 | Hedley | 382/44 |
| 4,774,678 | 9/1988 | David et al. | 382/45 |
| 5,023,723 | 6/1991 | Date et al. | 358/225 |
| 5,025,495 | 6/1991 | Avis | 358/140 |
| 5,070,465 | 12/1991 | Kato et al. | 382/44 |

Primary Examiner—Joseph Mancuso
Assistant Examiner—Wendy R. Greening
Attorney, Agent, or Firm—William S. Frommer; Alvin Sinderbrand

[57] ABSTRACT

A video image capture apparatus including an image sensor for sensing light at a plurality of pixel positions received via an optical system, picture storage means for temporarily storing pixels derived from the image sensor, address generation means for applying differing write and read addresses to the picture storage to effect mapping of input pixels from the image sensor to provide output pixels compensating for the effects of imperfections of the optical system is described. A video camera producing high quality output images for instance can thereby be produced.

14 Claims, 5 Drawing Sheets

VIDEO IMAGE CAPTURE APPARATUS FOR DIGITALLY COMPENSATING IMPERFECTIONS INTRODUCED BY AN OPTICAL SYSTEM

BACKGROUND OF THE INVENTION

1. Field of the Invention

The invention relates to video image capture apparatus including means for compensating for the effects of optical imperfections.

2. Description of the Prior Art

A high definition television system, for example with a resolution of 1920 pixels by 1035 active lines per frame makes very high demands on image capture apparatus such as cameras. High accuracy is required in capture resolution and also in picture geometry and registration. The resolution limits tend primarily to be a function of a sensor arrangement (e.g. a Charged Coupled Device (CCD) sensor or a tube target) of the capture apparatus whereas the accuracy of a picture geometry and registration is primarily determined by the capture apparatus's optical system through which light has to travel before reaching the sensor arrangement.

Significant distortion of the picture geometry can be introduced into a picture output from a camera, for instance, even when high quality lenses are used. Modern television cameras are typically provided with zoom lenses which may work over a relatively large optical range and fields of view. Due to the different optical and mechanical arrangements of the optical system contained in a zoom lens for different zoom settings, it is usually only possible to provide a highly accurate geometric arrangement at one point in the centre of range of operation of the lens. The better the lens, the less will be the distortion generated at other positions. However, it is not practically possible to make a zoom lens which is optically perfect at all points within the optical range. Typically, the design of a lens includes compromises to avoid excessive distortion at any particular point over its range of zoom operation. Similarly, compromises have to be made to avoid excessive distortions over the focusing range of a lens, whether a zoom lens or a lens of fixed focal length.

Other distortion effects can occur due to the placement and alignment of the image sensor or sensors in a camera, for example in a colour camera where a beam splitter is employed. These effects occur with fixed focal length lenses or zoom lenses.

As well as geometric distortions which can be introduced in the optical path through a lens (which may include many optical elements), chromatic distortions may appear at the image sensor. This is because the optical elements in the lens affect different light frequencies differently. Traditionally, a balance has to be met between the geometrical and registration errors which are considered unacceptable, and the expense of the lens. The tighter the specification of the lens (i.e. the lower the level of geometric, registration and chromatic errors which are acceptable), the more expensive it will be. It is to be noted that the cost of a lens in a camera system, for example a zoom lens on a video camera, is a significant portion of the total cost of the camera system, particularly where a very tight specification is required.

FIGS. 1A, 1B, 1C and 1D of the accompanying drawings illustrate four well known examples of geometric distortions which can be introduced into a picture by an optical system.

FIG. 1A illustrates the so called pin-cushion effect.
FIG. 1B illustrates a skew effect.
FIG. 1C illustrates barrel distortion.
FIG. 1D illustrates tilt distortion.

The distortions which occur in a lens system can be characterised to a first approximation by combination of linear distortion (tilt and/or skew) and second order parabolic distortion (barrel or pin-cushion distortion).

Tube cameras are known where electronic means are employed to approximate a correction to a picture distortion by applying inverse signals to the horizontal and vertical scan drives of the tube to cancel the distortion. In other words, rather than attempting to arrange for the horizontal scans to be as near to linear as possible, correction signals are used to modify the output of the horizontal and vertical scan drives to compensate for the distortion encountered. For example, with regards to FIG. 1A, if pin-cushion distortion is caused by the optical system, then the horizontal and vertical scan drives of the tube can be controlled so that the electron beam traces a pattern to compensate for the distortion, so that signals can be output from the tube camera which would reflect the original image without the distortions introduced by the optical system. Such electronic means are widely used in current tube cameras. However, these cancelling signals are normally generated in analogue circuitry and cannot compensate for distortions which are not characterised by combinations of first and second order effects. Moreover, the techniques currently used are only applicable to cameras with image sensors which employ a scanning beam.

The object of the invention is to provide a video image capture apparatus such as a video camera with means for compensating for the effects of imperfections of the optical system of an image capture apparatus which is not limited in application to cameras with image sensors employing scanning beams. For instance, the image sensor or sensors of the video camera might include CCD chips.

SUMMARY OF THE INVENTION

In accordance with the invention, there is provided a video image capture apparatus comprising:

at least one image sensor for sensing light at a plurality of pixel positions received via an optical system;

at least one picture storage means, each picture storage means associated with a respective image sensor for temporarily storing pixels derived from the respective image sensor; and address generation means for applying differing write and read addresses to each picture storage means to effect mapping of input pixels from each respective image sensor to provide output pixels associated with each image sensor compensated for the effects of imperfections of the optical system.

Preferably the address generation means provides write addresses for storing the input pixels from each image sensor in each respective picture storage means at addresses directly related to the sensed input pixel positions, and wherein the address generation means provides read addresses associated with each picture storage means for mapping the stored pixels from each picture storage means so as to form the output pixels associated with each image sensor which are compensated for the effects of imperfections of the optical system.

Thus, advantageously, even if the apparatus comprises more than one image sensor, the address generation means provides only one write address to each picture storage means. However, in the case of an apparatus comprising more than one image sensor, as each image sensor may be subject to differing effects of imperfections of the optical system, the address generation means provides different read addresses to each picture storage means for mapping the stored pixels.

Preferably each picture storage means has a pixel interpolator connected to it for interpolating between stored input pixels where the mapping does not provide one-to-one mapping between an input pixel position and an output pixel position. Advantageously, the address generation means provides read addresses having a major address portion for addressing each picture storage means and a residual address portion for controlling each pixel interpolator. In this way, output pixels are generated associated with each image sensor compensating for the image distorting effects of imperfections of the optical system in a way that is independent of the form of the distortion. That is: the distortion may be, for instance, first order skew or tilt, second order barrel or pin-cushion, or a higher order distortion, or even a distortion that cannot be represented by an analytic function.

In the case of an apparatus comprising two or more sensors, as an alternative to the address generation means applying the same write addresses, and differing read addresses to each sensor, an apparatus can be provided in which the address generation means applies write addresses associated with each picture storage means for mapping the input pixels from each image sensor onto each respective picture storage means so as to arrange the pixels to compensate for the effects of imperfections of the optical system and wherein the address generation means applies read addresses for directly outputting the stored pixels from the picture storage means to form the output pixels associated with each image sensor compensating for the effects of imperfections of the optical system. In this case it is preferable that a pixel interpolator is connected between the or each image sensor and each respective picture storage means for interpolating between the sensed image pixels where the mapping does not provide one-to-one mapping between an input pixel position and an output pixel position.

Preferably, the write addresses have a major address portion for addressing each picture storage means and a residual address portion for controlling each respective pixel interpolator.

Such an address generation means is preferably capable of generating address independently of any control signals from the corrector controller and so output pixels associated with each image sensor may be provided even if the optical system and/or each image sensor is unable to generate an information signal according to any varying parameters.

In a further embodiment of the invention, an interpolator is provided between the optical system and each picture storage means for motion adaptive progressive scan conversion. Such a video image capture apparatus is able both to compensate for the effects of imperfections in the optical system while taking account of movements within the image.

A video image capture apparatus according to an embodiment of the invention can compensate for distortion to an image created by the optical system in an efficient and effective way. The optical system may have varying parameters. For instance, the optical system may form part of a zoom lens. Even if the optical system is not part of a zoom lens, but a fixed focal length lens, it may be focused over a range of distances.

Advantageously apparatus according to the invention can form part of a colour camera. For instance image sensors, each sensitive to light of a different primary colour, may sense light passing through the optical system. Distortions to an image at any of the sensors, caused by imperfections of the optical system, can be separately compensated for by separate digital control signals. If desired, apparatus according to the invention could comprise any number of sensors.

Preferably, if the apparatus comprises more than one sensor, but only a single optical lens system, then an optical beam splitter means is provided in the optical system before the sensors. The beam splitter divides an image received by the optical system into a number of identical separate images and passes each separate image to a respective sensor. In this way, a number of sensors, each sensitive to light of different frequencies, can each receive the image received by the optical system. The separate images sensed by each sensor may later be combined. For instance, in the case of a colour camera comprising three sensors that are each sensitive to light of a different primary colour, the three primary colour images sensed by the sensors may be combined to form a full colour image.

Optical distortions may also be introduced by the positioning of the beam splitter and by the beam splitter itself. Further, the position of each sensor may give rise to a distortion of an image and so this position could also be a varying parameter. Preferably, the address generation means is responsive to control signals representative of current parameters to apply the address to each picture storage means to provide the output pixels compensating for the effects of imperfections of the optical system. Advantageously, the control signals can be supplied by a corrector controller. The corrector controller senses, for instance, the lens type, its current focusing position and, in the case of a zoom lens, its current focal length. These parameters may be constant or continuously varying. The corrector controller can supply the address generation means with control signals according to the current parameters of the optical system and/or each sensor.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1A:
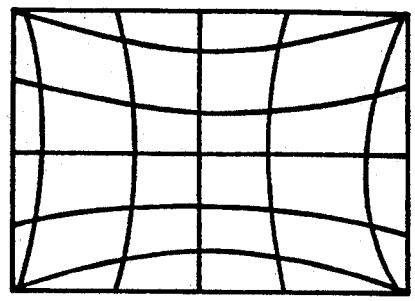
FIGS. 1A-1D illustrate typical geometric distortions which can be introduced by the optical system of an image capture apparatus.
Figure 1B:
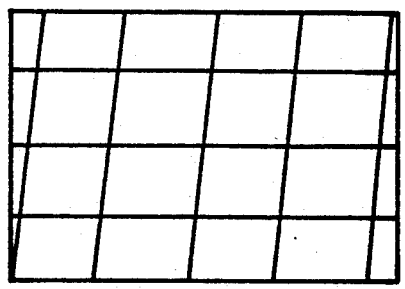
Figure 1C:
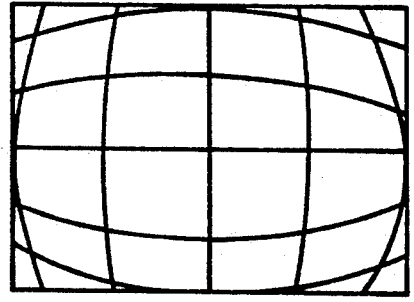
Figure 1D:
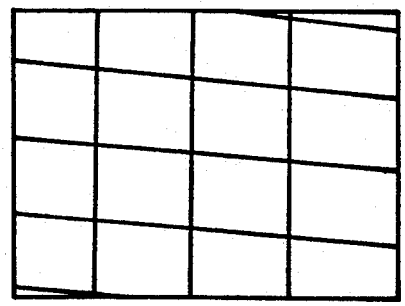
Figure 2:
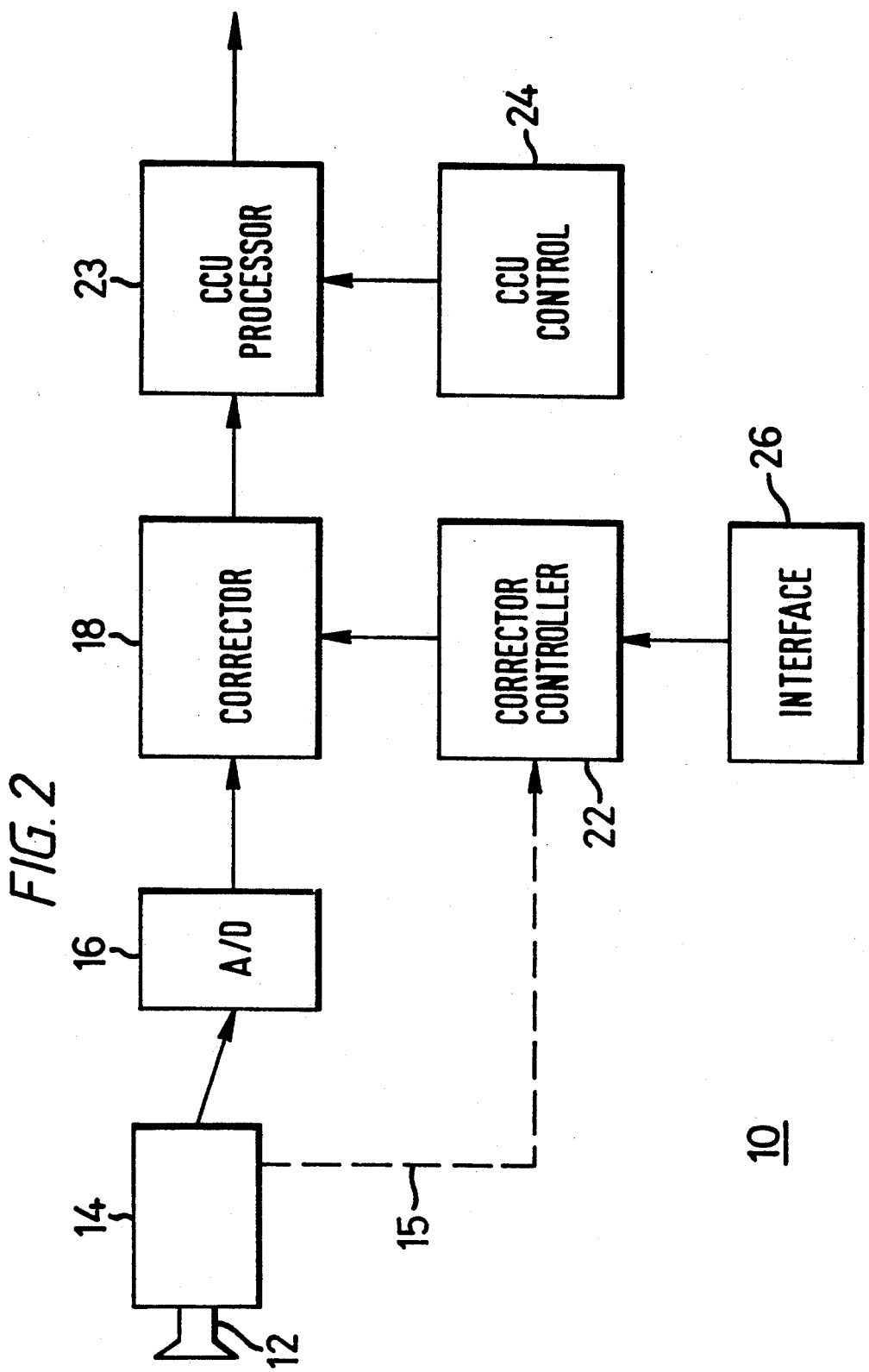
FIG. 2 is a schematic block diagram giving an overview of a video image capture apparatus in accordance with the invention.

FIG. 2 is a schematic block diagram providing an overview of an image capture apparatus in accordance with the invention in the form of a video camera system. The camera system has a camera head 10 which comprises an optical system 12, which includes a zoom lens and associated control circuitry, an image sensor 14 for registering light received through the optical system 12, and signal amplification and camera head control circuitry (not shown). An amplified output of the image sensor 14 is passed to an analogue to digital converter 16 which converts analogue image signals produced by an image on the image sensor 14 into digital signals for processing. The digital signal output of the analogue to digital convertor 16 comprises image pixel data which is passed to a geometry, registration and chromatic error corrector 18 which compensates for the effects of optical imperfections of the zoom lens. The corrector 18 is under the control of a corrector controller 22. The corrector controller 22 is connected to the lens control circuitry via a connection 15 to receive information about the current zoom and focus position, and the identity of the lens. From this information, the corrector controller 22 is able to provide appropriate control signals to the corrector 18 for performing the appropriate corrections to the pixel data. An interface 26 is provided for inputting external information to program the corrector controller 22 to provide the appropriate control signals according to various lens positions and the lens identity. The interface 26 can be a socket to enable the connection of the corrector controller 22 to a computer or the like for inputting the programming information. The output of the corrector 18 is supplied to a conventional Camera Control Unit (CCU) processor 23 for conventional processing of the image data. The CCU processor 23 operates in a conventional manner under control of a CCU control unit 24.

Figure 3:
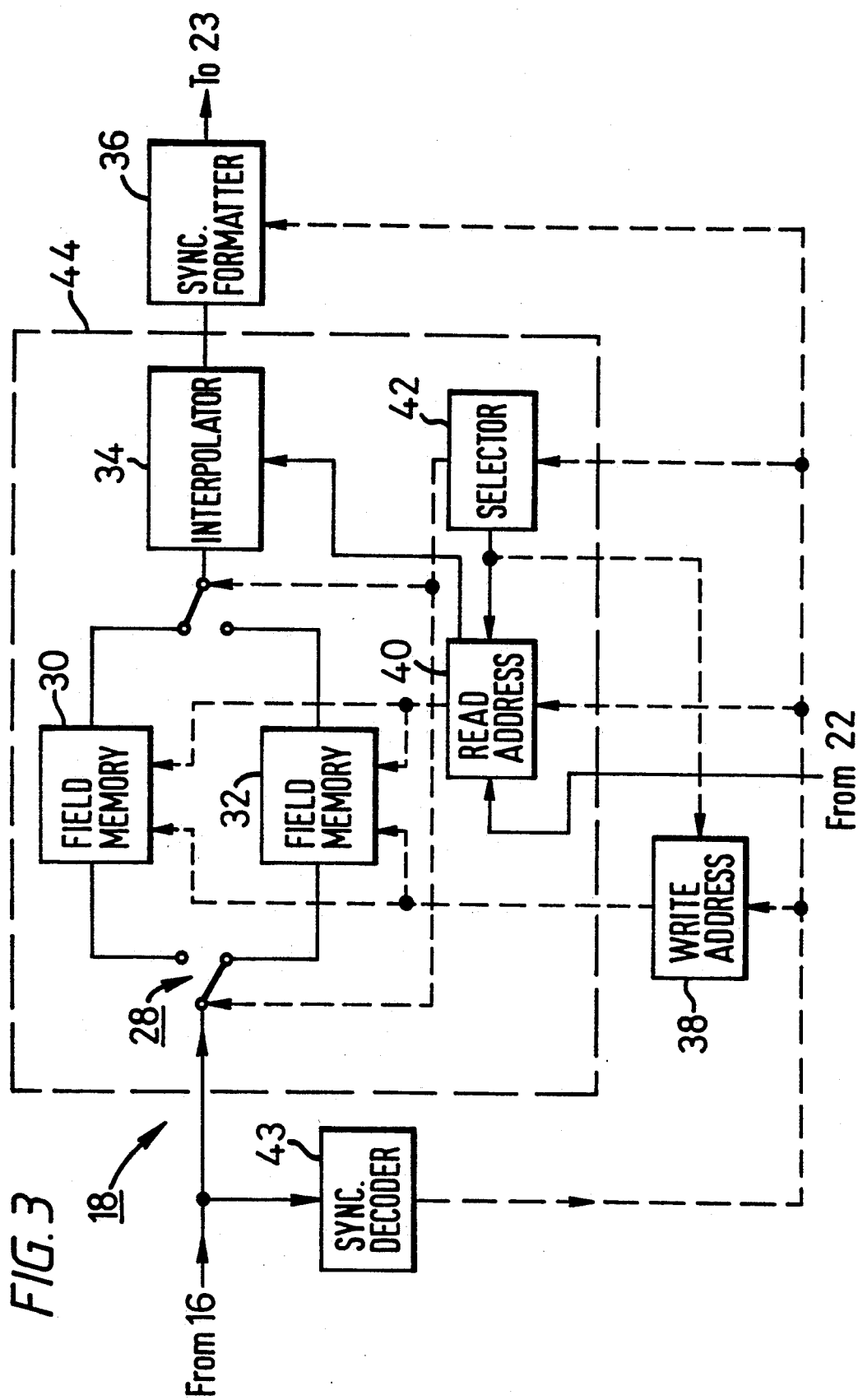
FIG. 3 is a schematic block diagram of a first example of a geometry, registration, and chromatic error corrector for the image capture apparatus of FIG. 2.

FIG. 3 is a schematic block diagram of one example of a geometry, registration and chromatic error corrector 18 for incorporation in the image capture apparatus illustrated in FIG. 2. The corrector 18 illustrated in FIG. 3 is able to process one image signal channel. In other words, the apparatus shown in FIG. 3 is suitable for a monochrome video image camera or for forming one channel of a colour camera.

The output from the analogue to digital convertor 16 is supplied to a picture storage 28. The picture storage 28 is arranged in a form of a pair of field memories 30 and 32 which are written to and read from on a field alternating basis so as to provide a continuous video output. A write address generator 38 is provided for determining write addresses for the first and second field memories 30 and 32 for the receipt of input pixel data from the analogue to digital convertor 16.

A read address generator 40 provides read addresses to the first and second field memories 30 and 32 for the outputting of corrected pixel data from those memories. A selector 42 controls switching of the video output from field memory 30 and field memory 32 and switching of video input pixel data to the field memories 30 and 32 by the provision of appropriate enable signals as will be apparent to one skilled in the art. In other words, the picture storage 28 comprises first and second field buffer memories 30 and 32, each address generators 38 and 40 addressing the memories 30 and 32 in an alternating manner during successive periods such that, during odd periods, the first buffer memory 30 receives write addresses for receiving input pixel data from the analogue to digital convertor 16 and the second buffer memory 32 receives read addresses for outputting output pixel data and, during even periods, the second buffer memory 32 receives write addresses for receiving input pixel data from the analogue to digital converter 16 and the first buffer memory 30 receives read addresses for outputting output pixel data, thereby providing the continuous video output. The write address generator 38 operates by providing continuous linearly incrementing row and column addresses (row by row and within each row column by column) to the field buffer memory currently being written to for storage of the picture in that memory as it is received from the analogue to digital convertor 16. In other words, a direct mapping of image signals from the image sensor 14 to addresses in the picture storage 28 is provided. The pixel data in the form of digital signals in the picture storage 28 therefore reflects the effects of any distortions and/or imperfections caused by the optical system formed from the image signals.

The read address generator 40, however, reads the information from the picture storage 28 in accordance with a mapping characteristic representative of the inverse of the distortion incorporated in the captured images. In other words, the read address generator 40, under control of the corrector controller 22, provides selective addressing of the picture storage 28 in order to generate the digital signal output in the form of pixel data for forming the rows and columns of an output image.

In order to provide high quality output video, the read address generator 40 calculates addresses to subpixel accuracy. In other words, there may not be an exact mapping from a pixel in the picture storage 28 on to a particular output pixel. In order to correctly generate the output pixel it may be necessary to interpolate between a number of pixels in the picture storage 28. Accordingly, a pixel interpolator 34 is provided for this purpose. The read address generator 40 produces addresses comprising a major, or integer portion which is used for addressing the pixel locations in the picture storage 28 and a fractional or residual proportion which is used for controlling the interpolator 34. The output of the pixel interpolator 34 is supplied to a synchronisation formatter 36 for output to the CCU processor 23.

For synchronising the operation of the various elements of the corrector 18, a synchronisation decoder 43 extracts synchronisation information from the digital signal output from the analogue to digital converter 16 and supplies control signals to the various elements of the corrector 18 to ensure an accurate periodic alternation between the operation of the two field memories 30 and 32.

Figure 4:
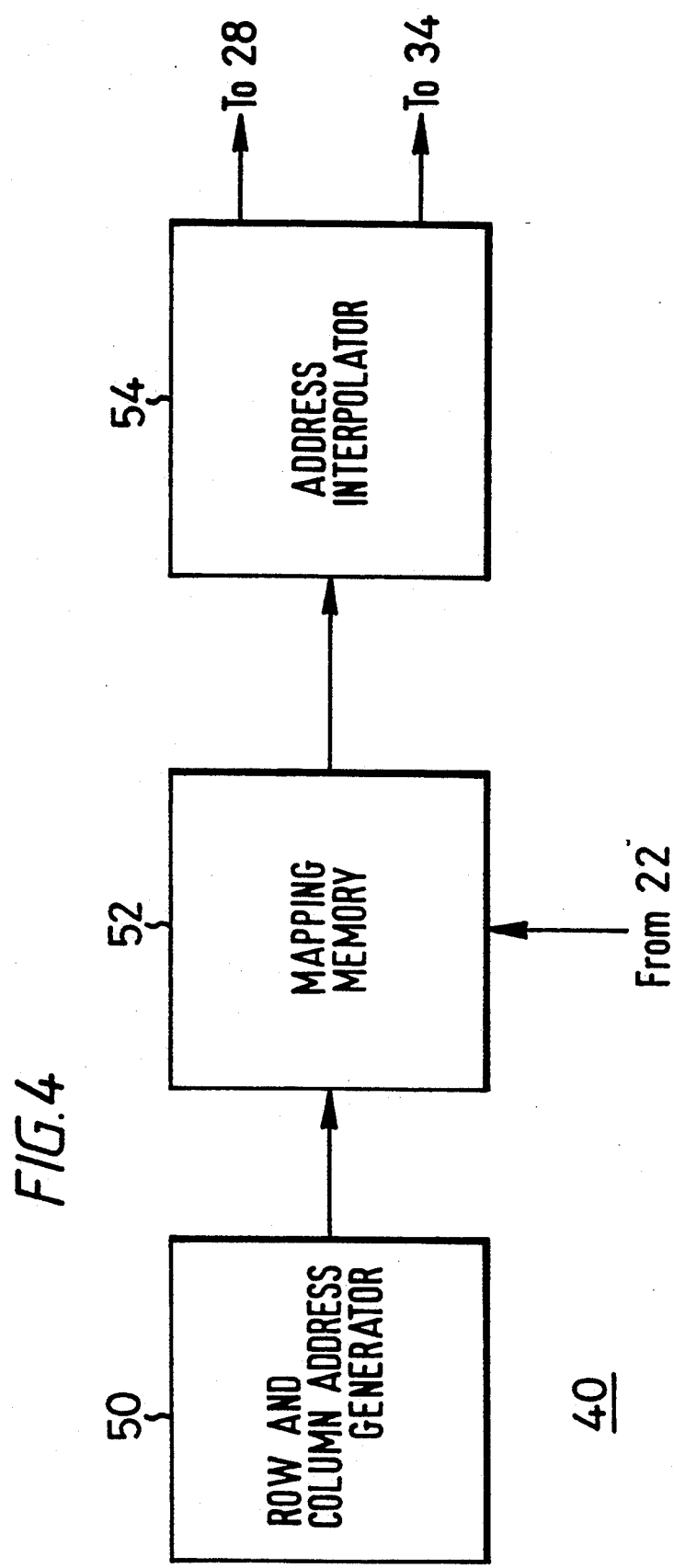
FIG. 4 is a schematic block diagram of an address generator forming part of the corrector unit of FIG. 3.

FIG. 4 is a schematic block diagram of the read address generator 40. The read address generator 40 comprises a simple row and column address generator 50 which generates pixel addresses by column by column and, within each column, row by row. These addresses are used to access a mapping memory 52 which contains the picture storage address which needs to be accessed in order to select a pixel or pixels from the picture storage 28 in order to produce an output pixel for display at the address produced by the simple address generator 50. In other words, the mapping memory 52 is in the form of a translation table defining the mapping which needs to be performed in order to correct for effects of the distortions in the optical system.

The row and column address generator 50 and the mapping memory 52 need not operate at the full resolution of the picture storage 28. For example, they may contain locations corresponding to a grid density of ⅛th horizontal and ⅛th vertical resolution. The map grid density depends on the geometric accuracy of the correction required. If the distortion is smooth, then sub-sampling by much greater numbers may be practical.

The output of the mapping storage 52 is fed to an address interpolator 54, which produces linearly interpolated full resolution pixel and line addresses. The integer part of each of the horizontal and vertical addresses is used to address the picture storage 28, whilst the fractional part of those addresses is fed to the interpolator 34.

The information relating to a current zoom and focus position and the identity of the lens is downloaded to the mapping memory 52 during a non-active scan time, in other words during a time when the read address generator 40 is not active.

Calibration of the mapping memory 52 is performed manually by providing a test card with a regular square grid pattern and manually adjusting the parameters stored to produce a corrected pattern. This could be done for example by displaying the camera output on a display containing a superimposed graticule.

Figure 5:
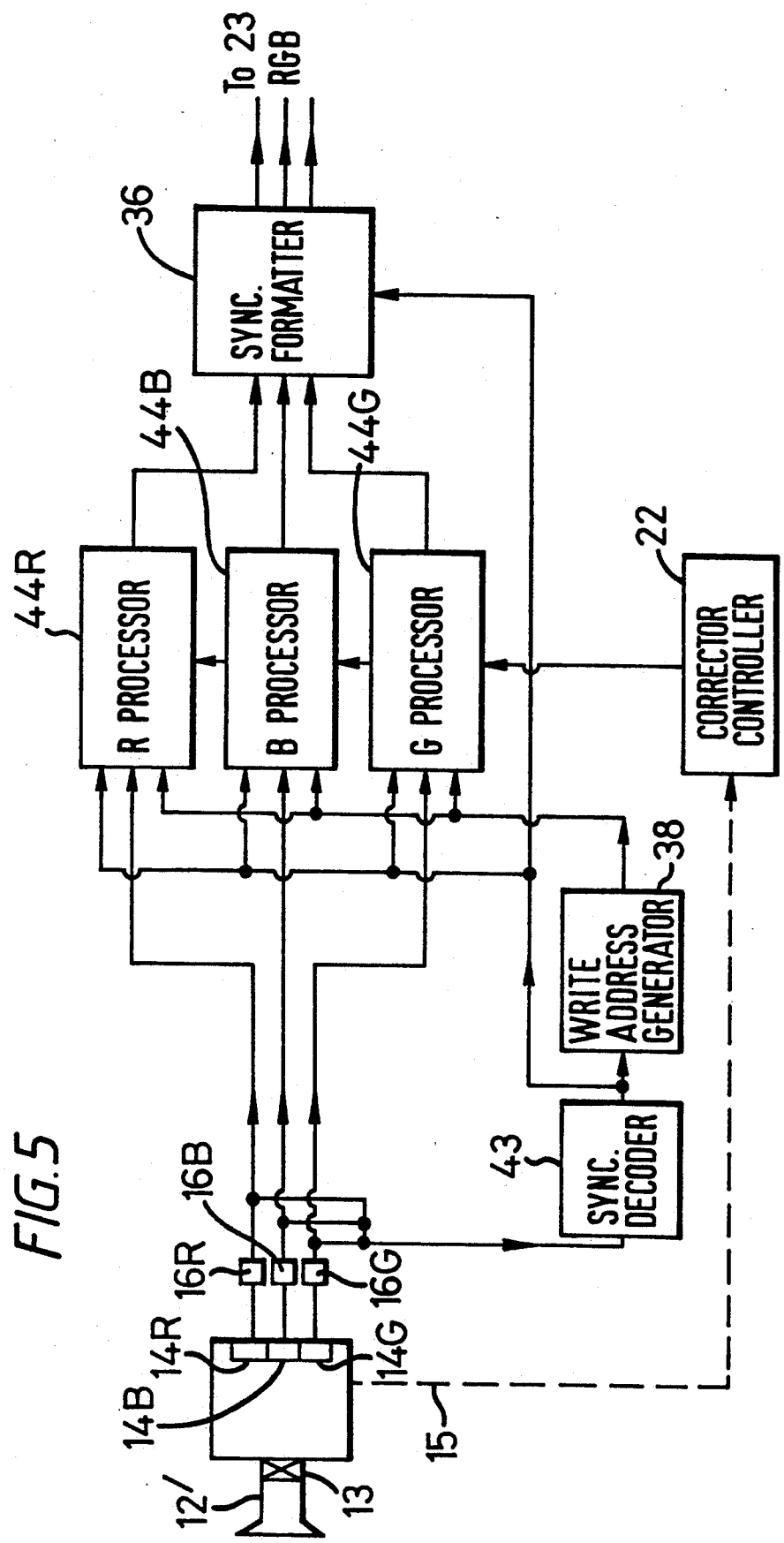
FIG. 5 is a schematic block diagram of a second example of a corrector for the image capture apparatus of FIG. 2.

As mentioned above, a geometry, registration and chromatic error corrector 18 provides for the correction of one channel of input video information. In a full colour (e.g. a RGB) system, three channels of correction need to be provided. However, it is not necessary to provide all of the elements in FIG. 3 for each of the channels. Several parts of the corrector 18 could be common to all three channels. Specifically, there need only be one synchronisation decoder 43, one write address generator 38, and one synchronisation formatter 36. The remaining components of FIG. 3 enclosed by the dotted line 44 in that Figure are, however provided separately for each of the separate channels. FIG. 5 illustrates this arrangement with separate red, blue and green processors 44R, 44B, and 44G, respectively.

Each one of the processors 44R, 44B, and 44G receives digital image signals from a respective image sensor 14R, 14B, and 14G via a respective analogue to digital converter 16R, 16B and 16G. Each image sensor 14R, 14B and 14G registers light through an optical system 12' which includes an optical beam splitter 13 for producing three light beams.

There has been described a video capture apparatus including means for compensating for the effects of optical imperfections. It will be appreciated that the particular embodiments described are illustrative and that many additions or modifications are possible within the scope of the invention.

For instance, an alternative to the arrangements of elements in the embodiments of the invention described above would be to have the write address generator, rather than the read address generator responsive to the corrector controller. In this case the interpolator would be located prior to the picture storage.

It would be possible to incorporate known progressive scan conversion techniques into the apparatus. For instance a motion adaptive progressive scan converter (MAPSC) could be placed between the analogue to digital converter and the corrector to receive digital signals and pre-process them before they are corrected. The MAPSC would receive the image pixel data from the analogue to digital converter in an array comprehendible form. In wholly static picture areas inter-field interpolation is applied whilst if significant motion is detected intra-field interpolation is performed by the MAPSC. The processed pixel data from the MAPSC would then be passed to the corrector. In this way, a capture apparatus according to the invention could provide output pixels compensating for the effects of imperfections of the optical system when there is significant motion in the image.

Although the means for compensating for the effects of optical imperfections herein described is well suited to a high definition television standard system, it is also equally applicable to a lower definition system, such as one with a resolution of 625 or 525 active lines per frame. In both cases the apparatus provides a higher quality video output from a video image capture apparatus by mitigating the effects of optical imperfections.

Also, the correction circuitry could be placed after, rather than before the CCU.

Although the embodiment of the invention described above is a camera system comprising a camera head and signal processing circuitry, incorporating the correction circuitry for compensating for the effects of imperfections in the optical system, separate from the camera head, the correction circuitry and/or other signal processing circuitry could be incorporated in the camera head. Indeed the correction circuitry could be incorporated in a camera or camera/recorder designed for stand alone operation.

The corrector controller in the embodiments described above is responsive to signals from the optical system representing its current parameters to produce control signals for the address generation means. In the case where the optical system is used by more than one image sensor, it can include an optical beam splitter. The beam splitter may also distort an image being passed through it and the corrector controller could be made sensitive to control information from it. Further, the positioning of the individual image sensors within the capture apparatus may be variable and may give rise to image distortion. In that case the corrector controller could be made sensitive to control signals from the or each image sensor.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:
1. A video image capture apparatus comprising:
   at least one image sensor for sensing light captured by an optical system at a plurality of pixel positions and providing respective input pixels, said optical system exhibiting optical imperfections;
   at least one picture storage means, each picture storage means associated with a respective image sensor for temporarily storing the input pixels derived from the respective image sensor; and
   address generation means for applying differing write and read addresses to each picture storage means to map the input pixels from each respective image sensor into output pixels associated with the respective image sensor which are compensated for the imperfections introduced by the optical system.

2. A video image capture apparatus as claimed in claim 1 wherein the address generation means provides write addresses for storing the input pixels from each image sensor in each respective picture storage means at addresses directly related to the sensed input pixel positions, and wherein the address generation means provides read addresses associated with each picture storage means for mapping the stored pixels from each picture storage means so as to form the output pixels associated with each image sensor compensated for the imperfections introduced by the optical system.

3. A video image capture apparatus as claimed in claim 2 further comprising at least one pixel interpolator, each pixel interpolator connected to a respective picture storage means for interpolating between stored input pixels where the mapping between an input pixel position and an output pixel position is other than a one-to-one mapping.

4. A video image capture apparatus comprising:
   at least one image sensor for sensing light at a plurality of pixel positions received via an optical system;
   at least one picture storage means, each picture storage means associated with a respective image sensor for temporarily storing pixels derived from the respective image sensor and for providing the stored pixels as output pixels;
   at least one pixel interpolator, each pixel interpolator connected to a respective picture storage means for interpolating between said output pixels in response to an interpolation control signal; and
   address generation means for applying write addresses to each picture storage means for storing the input pixels from each image sensor in each respective picture storage means at addresses directly related to the sensed input pixel positions, and for applying read addresses to each picture storage means for mapping the stored pixels from each picture storage means so that said output pixels are associated with each image sensor and are compensated for the effects of imperfections of the optical system, said read addresses having a major address portion for addressing each picture storage means and a residual address portion, said residual address portion being provided as said interpolation control signal for controlling each pixel interpolator where the mapping between an input pixel position and an output pixel position is other than a one-to-one mapping.

5. A video image capture apparatus as claimed in claim 1 wherein the address generation means applies write addresses associated with each picture storage means for mapping the input pixels from each image sensor onto each respective picture storage means so as to arrange the pixels to compensate for the imperfections introduced by the optical system and wherein the address generation means applies read addresses for directly outputting the stored pixels from each picture storage means to form the output pixels associated with each image sensor compensated for the imperfections introduced by the optical system.

6. A video image capture apparatus as claimed in claim 5 further comprising at least one pixel interpolator, each pixel interpolator connected between a respective image sensor and its associated picture storage means for interpolating between the sensed image pixels where the mapping between an input pixel position and an output pixel position is other than a one-to-one mapping.

7. A video image capture apparatus comprising:
   at least one image sensor for sensing light at a plurality of pixel positions received via an optical system;
   at least one picture storage means, each picture storage means associated with a respective image sensor for temporarily storing pixels derived from the respective image sensor;
   at least one pixel interpolator, each pixel interpolator connected between a respective image sensor and a respective picture storage means for interpolating between the sensed image pixels in response to an interpolation control signal; and
   address generation means for applying write addresses to each picture storage means for mapping the input pixels from each image sensor, as selectively interpolated, onto each respective picture storage means so as to arrange the pixels to compensate for the effects of imperfections of the optical system, and for applying read addresses to each picture storage means for directly outputting the stored pixels from each picture storage means to form output pixels associated with each image sensor compensated for the effects of imperfections of the optical system, said write addresses having a major address portion for addressing each picture storage means and a residual address portion, said residual address portion being provided as said interpolation control signal for controlling each pixel interpolator where the mapping between an input pixel position and an output pixel position is other than a one-to-one mapping.

8. A video image capture apparatus as claimed in claim 1 further comprising at least one interpolator, each interpolator connected between the optical system and a respective picture storage means for performing motion adaptive progressive scan conversion.

9. A video image capture apparatus as claimed in claim 6 in which each pixel interpolator also performs motion adaptive progressive scan conversion.

10. A video image capture apparatus as claimed in claim 1 wherein each picture storage means comprises first and second buffer memories, the address generation means alternately addressing each pair of memories during successive periods such that, during odd periods, each first buffer memory receives the write addresses for receiving input pixels from each respective image sensor and each second buffer memory receives the read addresses for outputting output pixels associated with each image sensor and, during even periods, each second buffer memory receives the write addresses for receiving input pixels from each respective image sensor and each first buffer memory receives the read addresses for outputting output pixels associated with each image sensor.

11. A video image capture apparatus as claimed in claim 1 in which at least one of the optical system and each image sensor have varying parameters, and the address generation means is responsive to control signals representative of the parameters to apply at least one of the write and read addresses to each picture storage means to provide the output pixels compensated for the imperfections introduced by the optical system.

12. A video image capture apparatus as claimed in claim 11, further comprising a corrector controller which is responsive to the varying parameters of at least one of the optical system and each image sensor for generating the control signals to which the address generator is responsive.

13. A video image capture apparatus as claimed in claim 1 comprising three image sensors, each sensitive to a different primary colour.

14. A video image capture apparatus as claimed in claim 13 in which the optical system includes a beam splitter means and wherein each image sensor senses light travelling along a different path from the beam splitter.

* * * * *